3,560,456
PROCESS OF FORMING COPOLYMERS OF MALEIC ANHYDRIDE AND AN ALIPHATIC OLEFIN HAVING FROM 16 TO 18 CARBON ATOMS
Stanley M. Hazen, Cheswick, and William J. Heilman, Allison Park, Pa., assignors to Gulf Research & Development Company, Pittsburgh, Pa.
No Drawing. Filed May 26, 1969, Ser. No. 827,921
Int. Cl. C08f 1/08
U.S. Cl. 260—78.5        8 Claims

ABSTRACT OF THE DISCLOSURE

Maleic anhydride and an aliphatic olefin having from 16 to 18 carbon atoms, such as 1-octadecene, are copolymerized in the presence of a free radical catalyst and a solvent such as a saturated dihalogenated aliphatic liquid hydrocarbon having from one to five carbon atoms, for example, propylene dichloride. Enough solvent is employed to solubilize not only the reactants but also the copolymer products. The copolymer is precipitated in a filterable particulate solid form by admixing the entire reaction product with an aliphatic monohydroxy alcohol having three carbon atoms, such as n-propanol.

This invention relates to the preparation of a copolymer of maleic anhydride and an aliphatic olefin having from 16 to 18 carbon atoms per molecule in a particulate solid form.

The preparation of copolymers of maleic anhydride and various unsaturated monomers, especially ethylene and styrene, is well known in the art. Many of the prior art processes relating to the preparation of maleic anhydride copolymers teach the use of solvents for the reaction which dissolve the maleic anhydride and ethylene, but which are non-solvents for the resulting copolymer so that the copolymer precipitates as a solid during the reaction and is capable of being separated from the reaction mixture by filtration or otherwise. It has been found, however, that in the preparation of a copolymer of maleic anhydride and an aliphatic olefin having from 16 to 18 carbon atoms per molecule, the resulting copolymers are very difficult to obtain in a particulate solid readily filterable form.

It has now been found in accordance with the invention that a copolymer of maleic anhydride and an aliphatic olefin having from 16 to 18 carbon atoms per molecule can be prepared by a process which comprises copolymerizing maleic anhydride and at least one of said olefins in the presence of a free radical catalyst and a solvent for the maleic anhydride, said aliphatic olefin and the resulting copolymer; and thereafter admixing said copolymer product while in solution with a monohydroxy aliphatic alcohol having three carbon atoms per molecule, the amount of said alcohol being sufficient and the rate of addition of said copolymer solution being such as to result in the precipitation of the copolymer in a particulate solid form.

The olefinic reactant can be a single olefin or a mixture of two or more olefins having from 16 to 18 carbon atoms per molecule. The preferred olefins are the aliphatic alpha-olefins having from 16 to 18 carbon atoms per molecule; the olefinic double bond can be in the beta position, although such olefins are difficult to copolymerize.

Examples of suitable olefins include, but are not limited to, 1-hexadecene; 2-hexadecene; 1-heptadecene; 1-octadecene; 2-octadecene; and 2-methyl-1-heptadecene.

Maleic anhydride is the other reactant used to prepare the desired copolymers by the process of this invention. It is preferred that the maleic anhydride be substantially free of maleic acid. The maleic anhydride will, of course, react with water to form the undesired maleic acid. Commercial maleic anhydride is suitable for use in the process of this invention, but in the event it is exposed to water and thereby becomes contaminated with maleic acid, means should be employed to remove the maleic acid before the maleic anhydride is used in the subject process. One suitable method of purifying the maleic anhydride is to dissolve the maleic anhydride in a liquid, such as benzene, which is a solvent for the maleic anhydride but a non-solvent for the maleic acid. The acid can be separated by filtration or otherwise and the maleic anhydride recovered by evaporation of the benzene.

The unreacted maleic anhydride is usually the more difficult monomer to remove from the polymer, and therefore, it is desirable to react essentially all of the maleic anhydride. Both the rate at which the maleic anhydride reacts and the total conversion of maleic anhydride can be increased by increasing the olefinic reactant concentration relative to the maleic anhydride. The molar ratio of olefin to maleic anhydride can vary between 0.1:1 and 100:1 with preferred molar ratios between 1:1 and 4:1. Due to the greater reactivity of the vinylidene type olefins, a slightly lower molar ratio can be employed.

The polymerization reaction is a solution-type polymerization wherein the maleic anhydride and olefin monomers are dissolved in a common solvent. The copolymerization can be initiated by any free radical producing material well known in the art. The preferred free radical initiators are the peroxide-type polymerization initiators and the azo-type polymerization initiators. Benzoyl peroxide is the most preferred initiator. Radiation can also be used to initiate the reaction if desired.

The peroxide-type free radical initiator can be organic or inorganic, the organic peroxides having the general formula:

$$R_7OOR_8$$

where $R_7$ is any organic radical and $R_8$ is selected from the group consisting of hydrogen and any organic radical. Both $R_7$ and $R_8$ can be organic radicals, preferably hydrocarbon, aroyl and acyl radicals, carrying, if desired, substituents, such as halogens, etc. The most preferred peroxides are the diaroyl and diacyl peroxides.

Examples of suitable peroxides, which are in no way limiting, include benzoyl peroxide; lauroyl peroxide; tertiary butyl peroxide; 2,4-dichlorobenzoyl peroxide; tertiary butyl hydroperoxide; cumene hydroperoxide; dicetyl peroxide; acetyl hydroperoxide; diethylperoxycarbonate; tertiary butyl perbenzoate; and the various compounds, such as the perborates.

The azo-type compounds, typified by alpha,alpha'-azo-bis-isobutyronitrile, are also well-known free radical promoting materials. These azo compounds can be defined as those having present in the molecule group —NN—, wherein the valences are satisfied by organic radicals, at least one of which is preferably attached to a tertiary carbon. Other suitable azo compounds include, but are not limited to, p-bromobenzenediazonium fluoborate; p-tolyl-diazoaminobenzene; p-bromobenzenediazonium hydroxide; azomethane and the phenyldiazonium halides. A suitable list of azo-type compounds can be found in U.S. Pat. No. 2,551,813, issued May 8, 1951 to Paul Pinkney.

The amount of initiator to employ, exclusive of radiation, of course, depends to a large extent on the particular initiator chosen, the olefinic charge stock and the reaction conditions. The initiator must, of course, be soluble in the reaction medium. The usual concentration of initiator is between 0.001:1 and 0.1:1 mole of initiator per mole of maleic anhydride, with preferred amounts between 0.005:1 and 0.03:1. In general, the more reactive olefins, such as the vinylidene type, require smaller amounts of the initiator.

The polymerization temperature must be sufficiently high to break down the initiator to produce the desired free radicals. For example, using benzoyl peroxide as the initiator, the reaction temperature can be between 75° C. and 90° C., preferably between 80° C. and 85° C. Higher and lower temperatures can be employed, a suitable broad range of temperatures being between 20° C. and 200° C. with preferred temperatures between 50° C. and 120° C.

The reaction pressure can be atmospheric or below, but super-atmospheric pressures of up to 1,000 p.s.i.g. or higher can be used. It is preferred to maintain the olefinic reactants in the liquid phase for better contacting. The preferred pressure is, of course, atmospheric pressure.

The reaction time is usually sufficient to result in the substantially complete conversion of the maleic anhydride monomer to copolymer. The reaction time is suitable between 1 and 24 hours, with preferred reaction times between 2 and 10 hours.

The copolymers of this invention generally have inherent viscosities of between 0.05 and 1.5 deciliters per gram. This is measured by dissolving five grams of copolymer in one deciliter of acetone and measuring the inherent viscosities at 25° C. This inherent viscosity is indicative of molecular weight. Copolymers having higher or lower molecular weights, i.e. higher or lower viscosities, can be prepared.

As noted above, the subject reaction is a solution-type polymerization reaction. The olefin, maleic anhydride, solvent and initiator can be brought together in any suitable manner. The important factors are intimate contact of the olefin and maleic anhydride in the presence of a free radical producing material. The reaction, for example, can be conducted in a batch system where the olefin is added all initially to a mixture of maleic anhydride, initiator and solvent or the olefin can be added intermittently or continuously to the reaction pot. In another manner, the components in the reaction mixture can be added continuously to a stirred reactor with continuous removal of a portion of the product to a recovery train or to other reactors in series. The reaction can also suitably take place in a coil-type reactor where the components are added at one or more points along the coil.

The reaction solvent, as noted above, must be one which dissolves both the maleic anhydride and the olefinic monomer. It is necessary to dissolve the maleic anhydride and olefinic monomers, so as to bring them into intimate contact in the solution polymerization reaction. It has been found that the solvent must also be one in which the resulting copolymers are soluble, but not so soluble that the copolymers cannot be precipitated out of solution by the addition of the solution to a monohydroxy alcohol having three carbon atoms.

Suitable solvents include liquid saturated or aromatic hydrocarbons having from 6 to 20 carbon atoms; ketones having from 3 to 5 carbon atoms; and liquid saturated aliphatic dihalogenated hydrocarbons having from 1 to 5 carbon atoms per molecule, preferably from 1 to 3 carbon atoms per molecule. By "liquid" is meant liquid under the condition of polymerization. In the dihalogenated hydrocarbons, the halogens are preferably on adjacent carbon atoms. By "halogen" is meant F, Cl and Br. The amount of solvent must be such that it can dissolve the maleic anhydride and olefin monomers in addition to the resulting copolymers. The volume ratio of solvent to olefinic monomer is suitably between 1:1 and 100:1 and is preferably between 1.5:1 and 4:1.

The preferred solvents are the saturated hydrocarbons having from 6 to 10 carbon atoms and the saturated dichlorinated hydrocarbons having from 1 to 5, more preferably 1 to 3, carbon atoms.

Examples of suitable solvents include, but are not limited to:

(1) saturated hydrocarbons such as:
   pentane;
   hexane;
   heptane;
   octane; and
   isooctane
(2) aromatic hydrocarbons such as:
   benzene;
   xylenes; and
   toluene
(3) saturated dihalogenated hydrocarbons such as:
   dichloromethane;
   dibromomethane;
   1-bromo-2-chloro-ethane;
   1,1-dibromoethane;
   1,1-dichloroethane;
   1,2-dichloroethane;
   1,3-dibromopropane;
   1,2-dibromopropane;
   1,2-dibromo-2-methylpropane;
   1,2-dichloropropane;
   1,1-dichloropropane;
   1,3-dichloropropane;
   1-bromo-2-chloropropane;
   1,2-dichlorobutane;
   1,5-dibromopentane; and
   1,5-dichloropentane
(4) ketones such as:
   acetone; and
   methyl ethyl ketone.

The reaction mixture comprising the copolymer, any unreacted monomers and the solvent is then added to a liquid monohydroxy aliphatic alcohol having three carbon atoms at a rate such that the copolymer precipitates in a particulate filterable solid form.

It is preferable to remove any excess solvent before adding the reaction mixture to the alcohol since increased amounts of solvent merely require the use of increased amounts of alcohol to result in the precipitation of the copolymers. Usually the weight ratio of alcohol to solvent exceeds about 1:1 and is preferably in excess of 2:1. Preferably, a weight ratio of alcohol to solvent of about 4:1 is used, although ratios of 10:1 to 100:1 or more can be employed if desired. Of course the initial weight ratio of alcohol to solvent may be very, very high if a batch precipitation is used wherein the solvent mixture is added to a large volume of alcohol. A continuous precipitation system can also be employed where a stream of alcohol and a stream of solvent reaction product are simultaneously admitted to a precipitation hold tank in the proper ratios and product is continuously removed.

It has been found that alcohols such as methanol, ethanol and butanol are unsuitable for the precipitation of the maleic anhydride-($C_{16}$–$C_{18}$) olefin copolymers of this invention. The only alcohols which are suitable are the monohydroxy aliphatic alcohols having three carbon atoms per molecule, i.e. n-propanol and osopropanol.

The manner of admixing the reaction mixture with the non-solvent alcohol is not critical. The usual procedure is to admix the total reaction mixture from the polymerization reactor including the solvent, copolymer, any unreacted monomers and initiator with the non-solvent by pouring and adding the total reaction mixture to the non-solvent at such a rate that the copolymer forms a fine particulate solid suitable for separation by filtration or centrifugation. If the opposite procedure is employed, namely, if the non-solvent is added to the total reaction mixture, the copolymer will tend to precipitate in larger size pieces which are not desirable, but such a procedure of addition can be employed with proper stirring. The non-solvent alcohol is preferably stirred well during the addition of the reaction solution containing the copolymers. It is also prefered to add the hot reaction mixture at a temperature of between 50° C. and 95° C. to the cool non-solvent alcohol at a temperature between 20° C. and 50° C. Thus, the reaction mixture need not be cooled before addition to the non-solvent, and the addition of the hot reaction mixture to the cool non-solvent appears to aid in the formation of the finely divided particulate solid copolymer which is easily separable by filtration or centrifugation.

After the addition of the total reaction mixture to the non-solvent and the precipitation of the particulate solid copolymer, the copolymer is separated from the other components by any suitable means, such as by filtration or centrifugation. By following the process of this invention and using the defined solvent-$C_3$ alcohol combination, the copolymers are obtained in an easily filterable particulate solid form which has many advantages from the standpoint of ease of drying and handling. After separation of the copolymer solids, the remaining components can be separated by fractionation to recover the solvent, non-solvent and unreacted monomers for recycle. It is, therefore, also preferred to employ a particular solvent-non-solvent combination which is easy to separate by distillation.

The copolymer can be washed with any suitable liquid which can dissolve and thus remove any unreacted monomers. The solvent used in the reaction is suitable. The wash liquid is preferably heated to aid in the washing procedure. While the copolymer may be soluble in the wash liquid, the rate of solution of the coplymer is so much slower than the rate of solution of the monomers that very little of the copolymer is dissolved in the wash liquid. The copolymer can then be dried by any conventional drying procedure to remove any residual solvent and/or washing liquids.

The coploymer products are essentialy a chain of alternate groupings of maleic anhydride and the olefinic monomer reactants, this being true even though much higher or lower ratios of olefin to maleic anhydride than 1:1 were employed. The copolymers are useful for many purposes, including their use as dispersants for pigments, or as intermediates in the preparation of polyesters by their reaction with polyols or polyepoxides.

The invention will be further described with reference to the following specific examples.

A maleic anhydride-1-octadecene copolymer was prepared by adding 303 grams (1.2 moles) of 1-octadecene to a reaction mixture consisting of 200 grams (1.8 moles) of propylene dichloride, 58.8 grams (0.6 mole) of maleic anhydride, and 1.5 grams (0.006 mole) of benzoyl peroxide. The reaction conditions included a temperature of 115° C. to 117° C. (reflux), a pressure of atmospheric and a reaction time of four hours.

The reaction product was a solution of the maleic anhydride-1-octadecene coploymer and some unreacted monomers in propylene dichloride (1,2-dichloropropane). Upon cooling, the entire reaction product remained fluid.

EXAMPLE 1

When the maleic anhydride-1-octadecene reaction product solution was poured slowly at a temperature of about 25° C. into four times its weight of n-propanol at room temperature, a finely divided filterable white solid was formed which was easily separated by simple filtration.

Similar results are obtained for the preparation of a maleic anhydride-1-hexadecene copolymer.

EXAMPLE 2

Example 1 is repeated except isopropanol is employed. Substantially the same results are obtained.

EXAMPLE 3

When Example 1 was repeated except methanol was employed as the precipitating alcohol, an unsatisfactory sticky precipitate was obtained.

EXAMPLE 4

When Example 1 was repeated except ethanol was employed, an unsatisfactory sticky precipitate was obtained.

The use of higher carbon number alcohols than n-propanol, i.e. n-butanol, n-pentanol and n-hexanol, resulted in an undesirable solubilization of the copolymer in the alcohols.

The maleic anhydride-1-octadecene copolymer separated from the n-propanol in Example 1 contains physically held n-propanol in addition to some chemically combined n-propanol in the form of half-ester. That is, due to the time required for the precipitating and separating procedure, some reaction occurs between the n-propanol and the anhydride groups of the maleic anhydride - 1 - octadecene copolymer to produce small amounts of half-ester groups. These half-ester groups can be retained if desired by drying at temperatures less than 80° C. or reconverted to cyclic anhydride groups and n-propanol by drying the copolymer at a temperature in excess of 80° C. while removing the n-propanol from contact with the copolymer. Thus, the precipiated copolymer from Example 1 was found by infrared analysis to contain a small amount of ester groups which disappeared after the copolymer was dried under vacuum for 12 hours at 120° C. Preferably, the drying is done at a temperature from 80° C. to 150° C. for a time from 1 to 24 hours under vacuum to remove the alcohol.

Resort may be had to such variations and modifications as fall within the spirit of the invention and the scope of the appended claims.

We claim:

1. A process for the preparation of a copolymer of maleic anhydride and an aliphatic olefin having from 16 to 18 carbon atoms per molecule in a particulate solid form which comprises:
   copolymerizing maleic anhydride and at least one of said olefins in the presence of a free radical catalyst and a solvent for the maleic anhydride, said aliphatic olefin and the resulting copolymer; and
   thereafter admixing said copolymer product while in solution with a monohydroxy aliphatic alcohol having 3 carbon atoms per molecule, the amount of said alcohol being sufficient and the rate of addition of said copolymer solution being such as to result in the precipitation of the copolymer in a particulate solid form.

2. A process according to claim 1 wherein the olefin is 1-octadecene.

3. A process according to claim 2 wherein the solvent is a dihalogenated aliphatic liquid hydrocarbon having from 1 to 5 carbon atoms.

4. A process according to claim 3 wherein the solvent has from 1 to 3 carbon atoms.

5. A process according to claim 1 wherein the alcohol is n-propanol.

6. process according to claim 4 wherein the alcohol is n-propanol.

7. A process according to claim 2 wherein the copolymer solution is at a higher temperature than the alcohol when the copolymer solution is added to the alcohol.

8. A process for the preparation of a copolymer of maleic anhydride and an aliphatic olefin having from 16 to 18 carbon atoms per molecule in a particulate solid form which is ester free which comprises:
   copolymerizing maleic anhydride and at least one of said olefins in the presence of a free radical catalyst and a solvent for the maleic anhydride, said aliphatic olefin and the resulting copolymer;

thereafter admixing said copolymer product while in solution with a monohydroxy aliphatic alcohol having three carbon atoms per molecule, the amount of said alcohol being sufficient and the rate of addition of said copolymer solution being such as to result in the precipitation of the copolymer in a particulate solid form;

separating said precipitated copolymer; and thereafter drying said separated copolymer at a temperature in excess of 80° C. under vacuum to remove any alcohol.

References Cited

UNITED STATES PATENTS

| 2,542,542 | 2/1957 | Lippincott et al. | 252—56 |
| 2,892,793 | 6/1959 | Stewart et al. | 252—56 |
| 3,404,135 | 10/1968 | Tietz | 260—78.5 |
| 3,461,108 | 8/1969 | Heilman et al. | 260—78.5 |

JOSEPH L. SHOFER, Primary Examiner

S. M. LEVIN, Assistant Examiner

U.S. Cl. X.R.

260—32.8, 33.6, 33.8